US010834875B2

(12) United States Patent
Paans

(10) Patent No.: US 10,834,875 B2
(45) Date of Patent: Nov. 17, 2020

(54) METHOD FOR INSTALLING A CULTIVATION FLOOR SYSTEM AND CULTIVATION FLOOR SYSTEM

(71) Applicant: ErfGoed Nederland B.V., GH Moerkapelle (NL)

(72) Inventor: Hugo Willem Lambertus Paans, GH Moerkapelle (NL)

(73) Assignee: ERFGOED NEDERALND B.V., GH Moerkapelle (NL)

( * ) Notice: Subject to any disclaimer, the term of this patent is extended or adjusted under 35 U.S.C. 154(b) by 97 days.

(21) Appl. No.: 15/934,325

(22) Filed: Mar. 23, 2018

(65) Prior Publication Data
US 2018/0206417 A1    Jul. 26, 2018

Related U.S. Application Data

(62) Division of application No. 14/767,390, filed as application No. PCT/NL2014/050083 on Feb. 12, 2014, now Pat. No. 9,980,440.

(30) Foreign Application Priority Data

Feb. 12, 2013  (NL) ..................... 2010289
Feb. 12, 2013  (NL) ..................... 2010290
Feb. 12, 2013  (NL) ..................... 2010291

(51) Int. Cl.
*A01G 9/24*   (2006.01)
*A01G 9/14*   (2006.01)
*A01G 27/00*  (2006.01)

(52) U.S. Cl.
CPC .......... *A01G 9/247* (2013.01); *A01G 9/1423* (2013.01); *A01G 27/001* (2013.01); *Y02A 40/252* (2018.01); *Y02A 40/27* (2018.01)

(58) Field of Classification Search
CPC .... A01G 9/247; A01G 9/1423; A01G 27/001; Y02A 40/27; Y02A 40/252
(Continued)

(56) References Cited

U.S. PATENT DOCUMENTS 2,150,257 A    3/1939  Winandy
3,106,043 A *  10/1963 Ferrand ................. A01G 27/04
                                                     47/81

(Continued)

FOREIGN PATENT DOCUMENTS

CA    2391552    12/2003
CA    2514707     2/2007
(Continued)

*Primary Examiner* — Tien Q Dinh
*Assistant Examiner* — Brady W Frazier
(74) *Attorney, Agent, or Firm* — Tutunjian & Bitetto, P.C.

(57) ABSTRACT

A cultivation floor system has a floor on which plant containers are to be placed. The system includes a watertight basin and a water-permeable structure in the basin, which structure has a permeable top cloth which forms the top side of the floor on which plant containers are placed. The structure includes one or more water-retaining layers. A watering installation supplies water so that water is available for the plants in the plant containers. A perforated film is placed between the permeable top cloth on the one hand and the one or more water-retaining layers on the other hand, which perforated film is made of impermeable film material which is provided with distributed perforations in such a manner that the film reduces the free evaporation surface for water from the one or more water-retaining layers.

13 Claims, 11 Drawing Sheets

(58) Field of Classification Search
USPC .............................................................. 47/39
See application file for complete search history.

(56) References Cited

U.S. PATENT DOCUMENTS

| | | | |
|---|---|---|---|
| 4,045,909 A | 9/1977 | Moss | |
| 4,255,898 A * | 3/1981 | Greenbaum | A01G 9/028 |
| | | | 220/533 |
| 4,300,311 A | 11/1981 | Marchant | |
| 4,452,397 A * | 6/1984 | Barton | A01G 25/09 |
| | | | 239/455 |
| 5,839,659 A * | 11/1998 | Murray | A01G 25/06 |
| | | | 239/1 |
| 5,938,372 A * | 8/1999 | Lichfield | A01G 25/06 |
| | | | 405/36 |
| 6,109,827 A | 8/2000 | Holloway, Jr. | |
| 6,178,691 B1 * | 1/2001 | Caron | A01G 27/04 |
| | | | 47/79 |
| 8,919,038 B2 * | 12/2014 | Jensen | A01G 31/02 |
| | | | 47/48.5 |
| 2007/0289213 A1 | 12/2007 | Van Geest et al. | |
| 2010/0329786 A1 * | 12/2010 | Gesser | A01C 23/042 |
| | | | 405/45 |
| 2012/0243940 A1 | 9/2012 | Thenhaus | |
| 2018/0368335 A1 * | 12/2018 | Paans | A01G 9/1423 |

FOREIGN PATENT DOCUMENTS

| | | |
|---|---|---|
| DE | 2914607 | 10/1980 |
| EP | 0532447 | 3/1993 |
| EP | 0594159 | 4/1994 |
| FR | 1551807 | 12/1968 |
| FR | 2798255 | 3/2001 |
| JP | H0349628 | 3/1991 |
| JP | 2000342065 | 12/2000 |
| NL | 9102059 | 7/1993 |
| WO | WO2011/103459 | 8/2011 |

\* cited by examiner

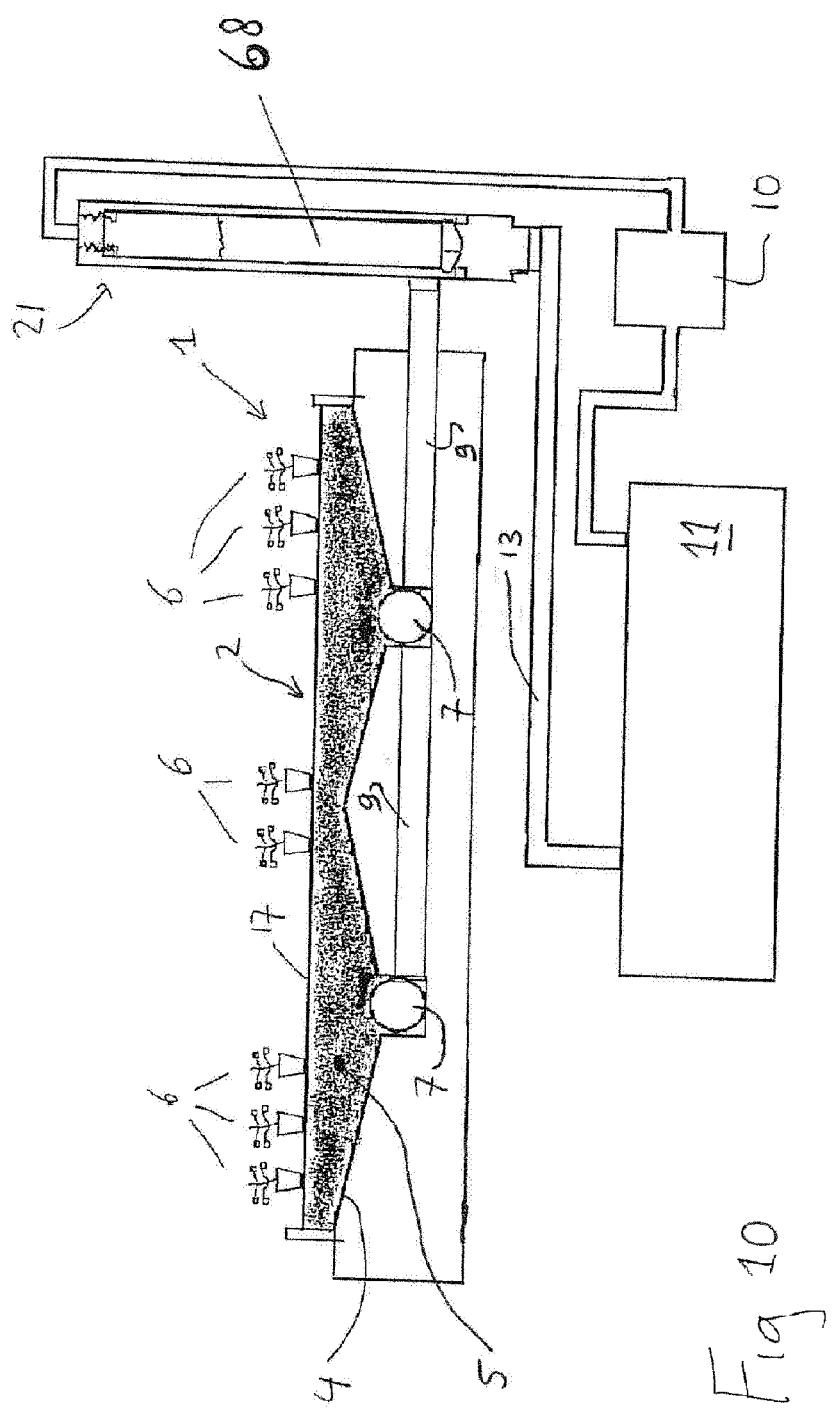

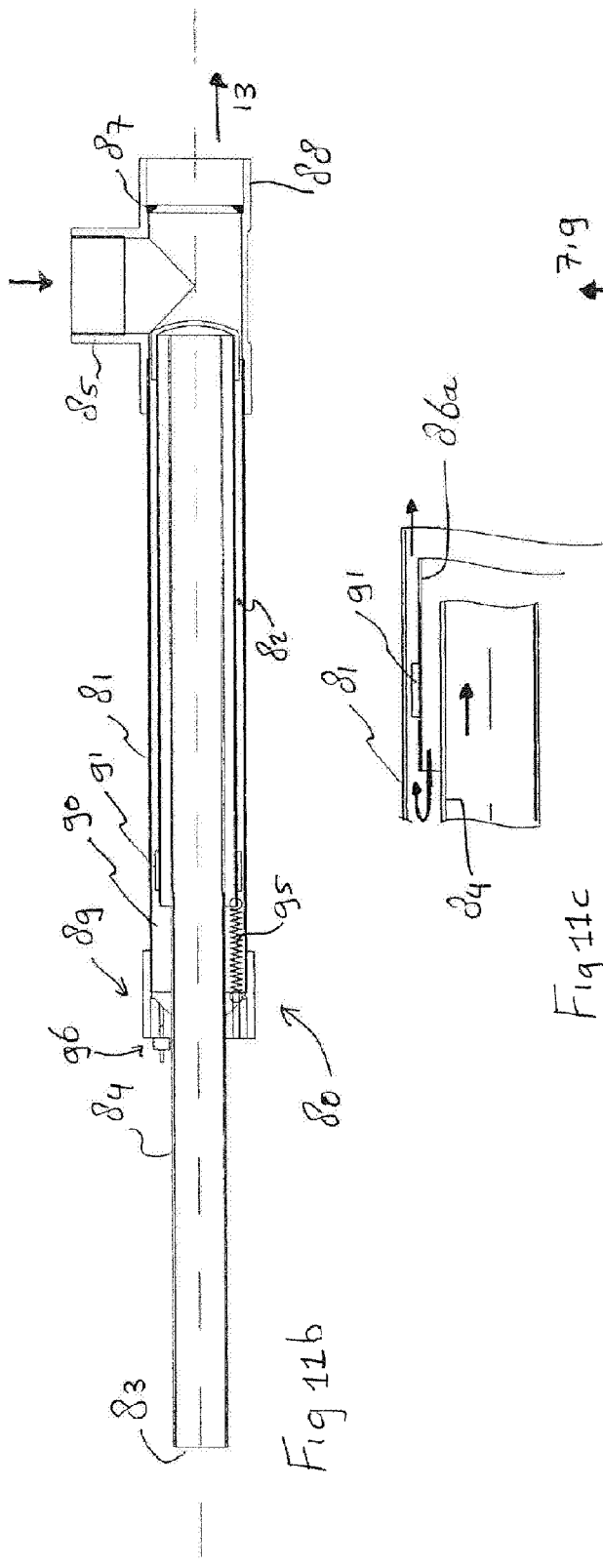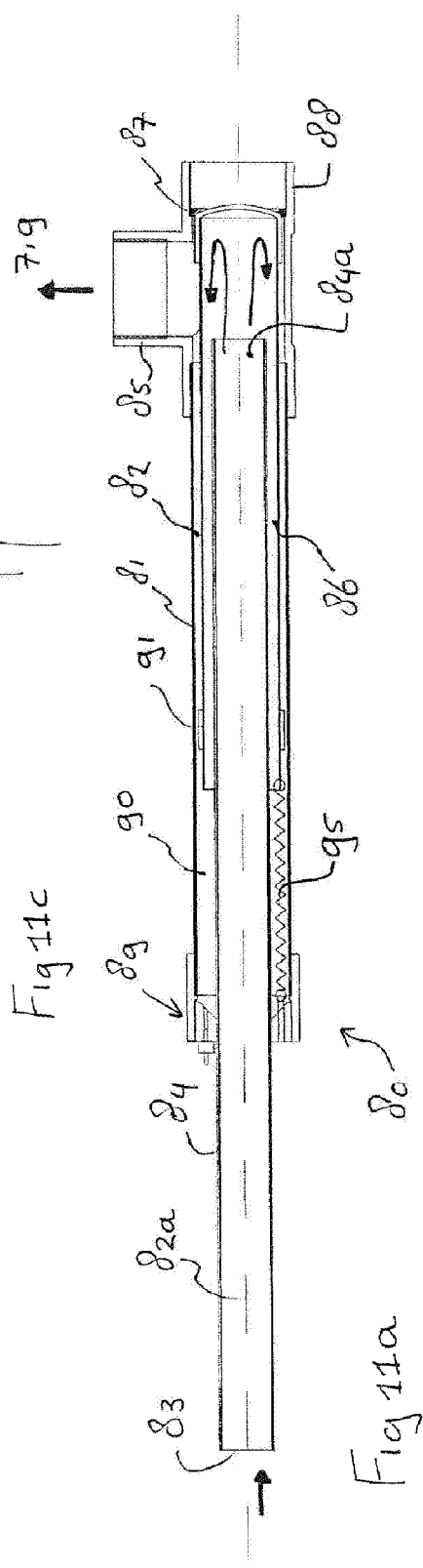

METHOD FOR INSTALLING A CULTIVATION FLOOR SYSTEM AND CULTIVATION FLOOR SYSTEM

CROSS-REFERENCE TO RELATED APPLICATIONS

This application is a divisional of application Ser. No. 14/767,390, filed Aug. 12, 2015, which is the U.S. National Stage of International Application No. PCT/NL2014/050086, filed Feb. 12, 2014, the contents of these applications are hereby incorporated by reference in their entirety.

TECHNICAL FIELD

A first aspect of the invention relates to a method for installing a cultivation floor system comprising a floor on which plant containers are placed. The cultivation floor system comprises an ebb/flood watering installation which is configured to alternately cause a supply of water to the cultivation floor and a discharge of water from the cultivation floor.

DESCRIPTION OF RELATED ART

It is known to install such a cultivation floor system, for example in a greenhouse, by first providing a watertight basin. In said basin, one or more irrigation lines are placed which comprise several outflow openings distributed along the length thereof which make it possible for water to flow from the one or more irrigation lines. A water pump is provided and is connected to the one or more irrigation lines.

A water-permeable structure is provided in the basin, which structure has a permeable and horizontal top which forms the floor on which plant containers are placed. In a known embodiment, said structure comprises one or more layers of granular material, for example volcanic rock, in which the one or more irrigation lines are covered by the permeable structure.

Such ebb/flood cultivation floor systems allow a very beneficial water supply to the plants in the plant containers. When water is supplied, the water level in the basin rises, in practice often until the water rises up through the permeable top everywhere and the bottom part of the plant containers is submerged in water.

Plastic pots, for example provided with holes near the underside, are used as plant containers, but other plant containers are also known. The pot is, for example, made of porous and/or biological material, such as coconut fibre, or no pot is used and the plant container consists of, for example, a growth substrate block, for example made of mineral wool or the like.

SUMMARY OF THE INVENTION

The first aspect of the invention is aimed at providing a further improvement of ebb/flood cultivation floor systems, in particular with a view to a desired high degree of uniform growth of all plants on the floor. Improving said uniformity is advantageous for the yield which the plants provide for the grower.

The first aspect of the invention achieves the abovementioned object by means of a method according to the present principles. Herein it is provided that the method comprises the steps of—while the one or more irrigation lines have been placed in the basin and the pump is connected thereto—supplying water to the one or more irrigation lines by means of the pump and monitoring the emerging flow of the water from the one or more irrigation lines in order to check whether the emerging flow is uniform across the one or more irrigation lines in the basin, and—if deviations in the emerging flow are observed—adjusting the effective emerging flow by providing the one or more irrigation lines, in situ, with one or more additional outflow openings or increasing the dimensions of one or more outflow openings at a location where the emerging flow is considered to be too small and/or closing one or more outflow openings of the irrigation lines or reducing the dimensions of one or more outflow openings at a location where the emerging flow is considered to be too large.

The first aspect of the invention is based on the insight that, upon accurate observation of known floors, it is found that the water level above the top does not rise in a uniform manner everywhere, as a result of which the plants at some locations have a different water regime than other plants at different locations on the cultivation floor. Although these differences are small, they appear to have an effect on the uniformity of plant growth. The invention is furthermore based on the insight that the emerging flow of water from the one or more irrigation lines affects the uniformity with which the water rises (viewed across the surface of the cultivation floor), despite the presence of a water-permeable structure in the basin.

The method according to the first aspect of the invention makes it possible to improve the uniformity of the rise of the water level, viewed across the floor, by adjusting "in situ" the effective emerging flow of the one or more irrigation lines. This is preferably carried out by providing the one or more irrigation lines with one or more additional outflow openings or increasing the dimensions of one or more outflow openings at a location where the emerging flow is thought to be too small.

In practice, the monitoring can take the form of a visual check by a monitoring individual, but it is also conceivable to provide a measuring system. For example, a system with one or more cameras could be provided which record the emerging flow and said images are then looked at by a monitoring individual. If desired, it is also possible to provide software which analyses the camera images in order to assess the emerging flow of water and determine the locations at which the emerging flow is too small and/or too large.

It is considered advantageous if the steps of supplying water, monitoring, and adjusting the effective emerging flow are repeated one or more times until a desired uniform emerging flow of water from the one or more irrigation lines is achieved, followed by providing the water-permeable structure in the basin.

The method of the first aspect of the invention can be carried out in a particularly effective way if a tool is used which produces and/or enlarges outflow openings, which tool is provided with a base comprising guide means, for example wheels, which are configured to engage with the irrigation line. The method then furthermore comprises placing the tool on the irrigation line and moving the tool along the line. The tool is then actuated at a location where it is desired to create one or more additional outflow openings or to enlarge the outflow opening in order to increase the effective emerging flow. As a result thereof, the installation person does not have to carry a tool, and a desired alignment of the tool with respect to the line can readily be achieved.

The tool may, for example, comprise a rotating saw blade, by means of which a cut is made in the line. For example, a standard manual circular saw is arranged in a frame provided with guide means which engage with the line.

For example, the step of providing one or more additional outflow openings or increasing the dimensions of one or more of the outflow openings comprises one or more operations from the list including: drilling, milling, sawing, burning, cutting, or punching. In a practical embodiment, sawing, in particular using a rotating saw blade, is advantageous.

Preferably, no corrugated lines are used as irrigation lines, but rather lines which have a closed and smooth, non-corrugated peripheral wall. For example PVC lines with a smooth wall. With the currently known installation method, a corrugated drainage line which has a corrugated wall provided at regular intervals with outflow openings is usually used as the irrigation line. It has been found that, due to the shape of their wall, these corrugated lines contribute to a non-uniform emerging flow of the water. In this respect, the lines with a smooth wall perform better and they are also available in strong designs, in which outflow openings can readily be made without being too disadvantageous for the mechanical load-bearing capacity of the line.

In a practical embodiment of the method, the irrigation lines placed in the basin, for example smooth walled PVC lines, are provided with several outflow openings along their length, for example at regular intervals, in an initial processing step.

In a practical embodiment, the basin has a bottom profile which is produced in a bed, for example in a bed of sand, comprising a channel in the bottom profile in which an irrigation line is provided and a bottom surface on one or both sides of the channel, preferably a bottom surface sloping towards the channel, wherein the bed is covered by a watertight membrane, after which the irrigation line is placed in the channel.

Preferably, the channel is formed such that it has a cross section which corresponds to the cross section of at least the bottom portion of the irrigation line to be accommodated therein. Thus, a zone where stagnant water could collect next to the bottom part of the irrigation line is avoided. In particular, this measure is advantageous if the line is only provided with outflow openings in a top portion, above the channel.

In a practical embodiment, the one or more outflow openings are formed or enlarged by means of a cut by a saw, for example in the longitudinal direction of the line.

Preferably, the irrigation line is accommodated in a channel, so that a top portion of the line is exposed, wherein the one or more outflow openings are formed or enlarged in the exposed top portion of the line. If desired, a small number of openings may be provided in the bottom portion in order to avoid accumulation of water at the underside of the line, and possible floating up of the drained line. This is an effective approach, for example, if only a top cloth is used as water-permeable structure.

After the emerging flow has been made uniform, a permeable mat or cloth is preferably placed over the irrigation line and adjacent surface parts of the basin bottom. On top of said cloth or mat, a granular layer may then be provided, for example.

In an embodiment, an elongate strip of gauze or an open fabric is firstly laid over the irrigation line after the emerging flow has been made uniform. This gauze or open fabric is intended to prevent granular material from sinking into the outflow openings later and thus substantially decreasing the actual dimensions of the outflow openings. For example, a strip having a width of between 20 and 50 centimetres is laid over the line provided with outflow openings.

In an embodiment, the basin bottom is provided with a watertight plastic film, which preferably also extends underneath the irrigation lines. If a granular layer is intended to be used as a water-permeable structure, it is preferred to lay a protective cloth over the watertight plastic film which prevents granular material from damaging the underlying plastic film, for example as a result of sharp points of the granular material perforating the film. Such a protective cloth preferably has a relatively closed structure and is, for example, configured as a closed fabric of synthetic material. In an embodiment, this protective cloth is laid over the irrigation line and over the strip of gauze or open fabric, if present, which has previously been laid over the irrigation line. In an embodiment, the protective cloth is stretched in order to cover the film neatly.

As the relatively closed protective cloth could disrupt the flow of water, in particular the emerging flow from the irrigation line, due to the density of the cloth, provision is made to make holes in the protective cloth at the location of the irrigation line so that the water flow is not adversely affected. For example, holes are made in this cloth exactly at the location of the outflow openings in the line. If the protective cloth is made of plastic material, as is preferred, holes could be made by locally heating the cloth using hot air, for example by means of a hot air blower, so that the cloth melts locally, thus forming the hole. This approach using hot air can also be used if said gauze or open fabric has been laid over the line, under the protective cloth, as the hot air easily flows through this gauze material and does not cause this material to melt. As a result of this approach of using hot air to form holes in the protective cloth after it has been installed, the correct position of this cloth is maintained and the protective cloth will also retain its strength. As a result of making the holes, the protective cloth may be a relatively closed cloth, which is advantageous with regard to the protective effect.

It will be clear that providing a strip of gauze material over the line and/or making holes in protective cloth at the location of the irrigation line as described above may also apply if the irrigation line is not provided with suitably dimensioned outflow openings 'in situ'. This may, for example, be an irrigation line which was provided with outflow openings before being installed in the cultivation floor or even during production of the line, which openings are not modified subsequently. In this situation too, the measures of providing the strip of gauze material and/or providing holes in a protective cloth (optionally using hot air) have the abovementioned advantages.

The technique of placing a strip of gauze material or open fabric, of a protective cloth, and of making holes in this protective cloth will be explained below as a separate fourth aspect of the invention.

In a simple variant, the permeable structure only consists of a water-permeable cloth or mat which is laid over the irrigation lines and the bottom of the basin. The first aspect of the invention furthermore relates to a cultivation floor system installed using the method according to the invention.

A second aspect of the invention relates to a cultivation floor system with a floor on which plant containers are placed. The cultivation floor system comprises a watertight basin and a water-permeable structure in the basin. The water-permeable structure has a permeable top cloth which forms the floor onto which the plant containers are placed. The structure furthermore has one or more water-retaining layers, for example of granular material, such as for example of volcanic rock. The permeable top cloth is highly porous and has small pores. Preferably, as is also the case in known systems, the top cloth is a woven top cloth having small pores between the yarns of the top cloth.

The system furthermore comprises a watering installation which is configured to supply water so that water is available for the plants in the plant containers, for example an overhead irrigation installation or, as is preferred within the framework of the second aspect of the invention, an ebb/flood watering installation.

Various embodiments of cultivation floor systems are known from the prior art, for example, with an ebb/flood watering installation, in which one or more layers of granular material are provided, a capillary mat on top of the top layer of granular material (partly for stabilizing), and on top of that the top cloth.

In practice, undesirable effects occasionally occur during use of such cultivation floor systems, in particular during use in greenhouses.

One problem is, for example, the fact the top cloth can become soiled/blocked to an undesirable degree by the growth of algae. As a result thereof, said top cloth has to be cleaned excessively often, which is labour-intensive.

Another problem relates to the climate in the greenhouse, where it is sometimes desirable to have a lower humidity percentage than can be achieved without having to discharge an excessive amount of air from the greenhouse (resulting in a significant loss of energy).

The second aspect of the invention is aimed at providing an improved cultivation floor system and cultivation floor therefor, by means of which one or more of said problems can be solved.

The second aspect of the invention provides a cultivation floor system according to the present principles, which is characterized in that a perforated film is placed between the permeable top cloth on the one hand and the one or more water-retaining layers on the other hand, which perforated film is made of impermeable film material which is provided with distributed perforations in such a manner that the film reduces the free evaporation surface for water from the water-retaining layer or layers, preferably by at least 50%, more preferably by at least 90%.

The second aspect of the invention is based on the insight that, for example, a granular layer or a different kind of water-retaining layer, retains a considerable amount of water, also when the water has flowed out of the basin. Due to the (usually heated) climate in the greenhouse (or optionally by heating in the cultivation floor itself), part of this water will evaporate and rise up through the permeable structure and the permeable top cloth in order to humidify the air in the greenhouse.

The second aspect of the invention is based on the insight that, with known floors, this evaporation takes place to an excessive degree. This regularly causes the effect, for example, where the top cloth always remains moist, since drying "from above" is effectively cancelled out due to the freely rising moisture of evaporation. This offers ideal conditions for the growth of algae in and on top of the top cloth, which thus becomes soiled and ultimately blocked.

The same rising water vapour also contributes to the moisture percentage in the air in the greenhouse, as a result of which the grower may not be able to achieve a lower percentage unless the air is replaced by drier air.

The second aspect of the invention provides the use of an intrinsically closed film which has, however, been provided with, preferably relatively large, perforations which significantly reduces the free evaporation surface as it were. This results in water which has remained behind in the one or more water-containing layers of the structure evaporating much less easily. Furthermore, this vapour only rises up at the location of the perforations in the film, as a result of which the top cloth easily dries out in the surface regions between these perforations.

With an ebb/flood watering installation, the size of the perforations is preferably chosen such that the perforations do not hamper any through-flow of water in an ebb/flood watering installation. For example, perforations are then provided which have a diameter of between 0.5 mm and 12 mm. Preferably, the smallest diameter is at least 1 mm or preferably 2 mm. For example, perforations with a diameter of 1.5 mm which are at least 4 mm apart or preferably perforations with a diameter of between 7 and 11 millimetres which are between 30 and 60 mm apart.

For example, the distance between adjacent perforations in the film or between groups of smaller perforations is at least 10 mm, which readily leads to dry zones in the top cloth.

In a practical embodiment, a perforated film is provided which is made of impermeable film material which is provided with distributed perforations with a mean surface area of the openings of between 0.75 mm$^2$ and 108 mm$^2$, wherein the perforations preferably form at most 10% of the surface area, optionally at most 5% of the surface area.

In a variant, the perforations are small, for example between 50 and 200 micrometres, which variant is not or hardly suitable for, in particular, ebb/flood watering installations, but may be used with other water-supply installations, such as drippers or overhead irrigation.

In an advantageous embodiment, the perforated film is a single-layer film, for example made of plastic. As the top cloth will generally be UV-resistant, and generally non-transparent, this film does not have to be particularly UV-resistant.

Preferably, the perforated film is situated as high up as possible in the water-permeable structure, but below the top cloth. Thus, for example, the top cloth is situated directly on top of the perforated film.

In a variant, the hydraulic connection between plants via the cultivation floor is considered to be important. In this case, a capillary mat may be provided directly underneath the top cloth, which capillary mat has a capillary action in the vertical direction and in the horizontal direction, with the perforated film being situated underneath the latter, for example having one or more layers of water-containing material, for example granular material, underneath it.

For example, a concrete basin is provided, with a capillary mat being arranged on the concrete with the perforated film on top thereof and the top cloth on top thereof. This may be carried out in combination with an ebb/flood watering installation, so that the water periodically rises above the top cloth. Optionally, a second, thin capillary mat may be provided between the perforated film and the top cloth in order to achieve the abovementioned mutual water-carrying connection between plant containers, if this is considered to be important. The underlying, optionally thicker capillary mat then serves as a water-containing layer.

In a more complicated embodiment, the top cloth is situated on a compressible mat having an open structure, which compressible mat may be compressed locally by the weight of each plant container, wherein non-compressed regions of the mat exhibit no capillary action and compressed regions provide a hydraulic connection between the plant container and the one or more water-retaining layers, wherein the compressible mat is situated on top of or underneath the perforated film and wherein the one or more water-retaining layers are situated at a lower level.

In this embodiment, the top cloth in the non-compressed regions is kept at an additional distance, as it were, from the one or more water-retaining layers and, as a result of the airy composition of the compressible mat, the top cloth can readily dry in those locations. At the locations where the compressible mat has been compressed by the weight of the plant container, there is a hydraulic connection, so that the plant can be provided with water. If the perforated film is situated underneath the compressible mat, which is preferred, this film prevents moisture, which evaporates from the water-retaining layer or layers, from penetrating into this compressible mat, or renders it more difficult. Due to the reduced supply of moisture from below, a relatively dry climate may be created in the non-compressed parts of the mat.

In a possible variant of a floor with a compressible mat, the perforated film is situated on a capillary mat which has a capillary action in the horizontal direction and in the vertical direction, for example a non-woven mat made of fibrous elements, for example a compacted non-woven mat. As a result thereof, moisture can also be transported in the horizontal direction underneath the film, for example from plant to plant.

In a preferred embodiment, an ebb/flood watering installation is provided which is configured to alternately cause a supply of water to the cultivation floor and a discharge of water from the cultivation floor, which watering installation comprises:
one or more irrigation lines in the basin, which irrigation lines have several outflow openings along their length which make it possible for water to flow from the one or more irrigation lines, wherein the one or more irrigation lines are covered by the water-permeable structure.

The second aspect of the invention also relates to a method for growing plants, for example in a greenhouse, wherein use is made of a cultivation floor system according to the second aspect of the invention.

The second aspect of the invention also relates to a method for growing plants, preferably in a greenhouse, wherein use is made of a cultivation floor system according to the second aspect of the invention, and wherein the perforated film is dimensioned in such a way with a free evaporation surface for water from the water-retaining layers that at least one of the following effects is achieved:
drying the top cloth during periods when the water basin is empty so that the growth of algae on or in the top cloth is prevented/avoided;
reducing the moisture percentage in the air in the greenhouse as a result of the evaporation of water from the one or more water-retaining layers being reduced;
maintaining a desired moist climate in the one or more water-retaining layers with a view to a biological state in those one or more retaining layers.

Plastic pots, for example provided with holes at the underside, are used as plant containers, but other plant containers are also known. For example, the pot is made of porous and/or biological material, such as coconut fibre, or no pot is present and the plant container is, for example, a block of growth substrate, for example made of mineral wool or the like.

A third aspect of the invention relates to a cultivation floor system with an ebb/flood watering installation.

The third aspect of the invention relates to a cultivation floor system comprising a cultivation floor with a watertight basin and a cultivation floor on which plant containers are placed. The cultivation floor system furthermore comprises an ebb/flood watering installation which is configured to alternately cause a supply of water to the cultivation floor and a discharge of water from the cultivation floor. In practical applications, the water level is regularly allowed to rise to a highest water level above the floor.

The cultivation floor may be a watertight, for example concrete, floor, which is overflowed during a flood, so that the bottom part of the plant containers is submerged in water. During ebb, the water is allowed to flow away, so that the floor goes dry.

In another known embodiment, which is also considered to be advantageous with the present invention, the cultivation floor has a water-permeable substructure and the upper side of the floor is also permeable, for example due to a permeable top cloth with one or more layers of granular material underneath it, such as for example volcanic rock. In this case, the one or more irrigation lines are usually in or under the one or more layers of granular material, so that the water in the permeable structure rises and falls uniformly across the basin during the cycle of flood and ebb.

Known cultivation floor systems, for example in a greenhouse, often comprise a large number of basins, wherein the ebb/flood cycle can be adjusted separately for each basin. With known systems, a watering installation with one or more irrigation lines in the basin and a pump for supplying water to the one or more irrigation lines is provided.

Furthermore, a water storage, for example a storage pond or an underground water storage, is provided. The pump takes water from the water storage and supplies it to the basin via the irrigation lines. After the water level has been kept at the desired higher level for a sufficiently long time, the water is allowed to flow back to the water storage via a discharge line. In order to control these flows, two valves are provided for each basin in known systems, namely a supply valve to the irrigation lines and a discharge valve to the discharge line. These valves are usually operated electrically and/or pneumatically.

With such a cultivation floor, correct operation of the ebb/flood watering installation is of paramount importance, since the plants could otherwise suffer considerable damage. The valves are a relevant source of malfunctions. This makes it necessary for the grower to keep a stock of completely new valves and/or parts for these and/or to have these delivered quickly, which increases costs.

The third aspect of the invention is aimed at providing a cultivation system with an improved valve assembly, in particular with regard to susceptibility to failure, ease of repair, and costs.

The third aspect of the invention achieves one or more of the abovementioned objects, for example, by a cultivation system according to the present application.

As will further become clear from the following description with reference to the drawing, the valves according to the third aspect of the invention operate completely mechanically and the valve can be produced in such a manner that the cost price is low. Also, the valve can be produced in such a manner that it can easily be cleaned/repaired, while not overly taxing a mechanic's skills.

In an advantageous embodiment, a resetting mechanism is provided which biases the piston into its open position, for example when the water volume in the reservoir of the piston has dropped below a certain amount. As a result thereof, the valve opens reliably and remains open until the pump supplies water again.

In an advantageous embodiment, the outflow channel of the piston opens at the outlet connection when the piston is in its closed position. As a result thereof, a reliable action of the outflow channel is achieved.

In a possible embodiment, the piston has an adjustable outflow channel so that the speed at which the reservoir in the piston empties is adjustable. As a result thereof, the duration of the high water level in the basin can be adjusted and can, for example, be adapted to the specific crops or cultivation regime. Preferably, mechanical adjustment means are provided, for example a manually adjustable outflow valve.

In a practical embodiment, a removable cover is provided at the top of the housing, so that the piston can be removed from the main cylinder, for example for cleaning and/or repair.

In a practical embodiment, the reservoir inlet is situated at the top of the piston and the pump inlet opens above the reservoir inlet. As a result thereof, it can easily be ensured that the reservoir is filled when the water supply via the pump inlet is started, so that the closed position of the piston is also achieved.

In a practical embodiment, the piston has a smaller diameter than the main cylinder, so that a ring-shaped passage for water is present, through which water can flow from the pump inlet to the irrigation line connection. The diameter may differ significantly, so that for example a gap of more than a centimetre is present between the piston and the main cylinder, making it impossible for undesired clamping to occur.

In a practical embodiment which is inexpensive and easy to maintain/repair the housing comprises a plastic pipe section, preferably made of PVC, which forms the main cylinder. Preferably, the piston also comprises a plastic pipe section, preferably made of PVC, which pipe section forms the reservoir of the piston. Other parts of the valve can also be made of plastic, for example the bottom part of the housing is produced as a T-piece, preferably made of PVC.

In a practical embodiment, the cultivation floor system comprises several basins, wherein a combined supply and discharge valve is provided at each basin.

The third aspect of the invention also relates to a method for operating a cultivation floor system according to the third aspect of the invention.

In this case, in order to supply water to the cultivation floor, the pump supplies water to the pump inlet of the combined supply and discharge valve, as a result of which the reservoir in the piston is filled and the piston is pushed onto the seat in its closed position. The water supplied by the pump flows into the basin via the irrigation line connection and the one or more irrigation lines, so that the water level therein rises. This supply is stopped when the water in the basin has reached a desired water level. In the meantime, water flows out of the reservoir in the piston—via the outflow channel—but the valve remains closed as long as the amount of water in the reservoir of the piston is sufficient to keep the valve in its closed position. When the amount of water in the reservoir of the piston drops below a certain amount, the valve opens, so that the water flows out of the basin and into the water storage via the one or more irrigation lines, the irrigation line connection and the outlet connection.

The third aspect of the invention provides that the time period for which the piston is in its closed position is adjusted by adjusting the outflow of the piston.

The third aspect of the invention also relates to a cultivation floor system comprising a cultivation floor with a watertight basin and a floor on which plant containers are placed, which cultivation floor system furthermore comprises an ebb/flood watering installation which is configured to alternately cause a supply of water to the cultivation floor and a discharge of water from the cultivation floor, wherein the ebb/flood watering installation comprises:
one or more irrigation lines in the basin;
a pump for supplying water to the one or more irrigation lines;
a discharge line;
a water storage, wherein the pump draws water from the water storage and the discharge line returns water to the water storage,
a valve assembly.

Herein, the valve assembly is characterized in that the valve assembly comprises a combined supply and discharge valve, wherein the valve comprises:
a housing;
a main cylinder in the housing, which main cylinder has an axis, optionally a horizontal axis;
a pump inlet connected to the main cylinder, which pump inlet is connected to the pump,
an irrigation line connection in the housing which is connected to the main cylinder and to which the one or more irrigation lines are connected;
wherein a valve piston is provided in the main cylinder so as to be movable along the axis,
wherein the housing is provided with a seat at an end of the main cylinder,
wherein an outlet connection is provided in the housing, to which the discharge line is connected,
wherein the outlet connection is provided in an end part of the housing, on that side of the seat which is turned away from the main cylinder,
wherein the valve piston can be moved to and fro between a closed position, in which the piston engages with the seat and closes off the outlet connection of the main cylinder, so that the pump inlet is connected to the irrigation line connection, and an open position in which the piston is at a distance from the seat so that the outlet connection is connected to the main cylinder and to the irrigation line connection,
and wherein a flow path for water is present between the valve piston and the housing, so that water can pass from the pump inlet to the irrigation line connection when the valve piston is in the closed position,
wherein the housing, on the end turned away from the seat, has an end cap, for example a removable cover, which forms a closure for the main cylinder, so that a variable chamber is formed between this end cap and the valve piston, which variable chamber is connected to the pump inlet,
wherein the valve is furthermore provided with a restriction element which forms a restriction at a location between the valve piston and the housing for water supplied via the pump connection, so that water pressure is created and/or amplified upstream of the restriction, which water pressure brings and keeps the valve piston in its closed position.

In a practical embodiment, the restriction element is a stationary and rigid restriction element which defines a fixed restriction surface area, which surface area is preferably smaller than the inner diameter of the pump inlet.

In an embodiment, the restriction element is provided between the outer periphery of the valve piston and the surrounding portion of the housing. Preferably, the restriction element is arranged on the outer periphery of the valve piston, for example in the form of a ring, wherein an annular gap is present between the ring and the housing.

With a valve according to the third aspect of the invention, the valve piston may furthermore be provided with a tubular portion which extends along the axis and has a bore which is open at that end of the valve piston which is turned away from the seat, wherein the housing comprises an inlet pipe connected to the pump inlet, which inlet pipe extends along the axis and projects into the bore in the tubular portion of the valve piston. Preferably, the inlet pipe only has a mouth at its axial end, so that the water squirts against the valve piston in the axial direction. Preferably, the inlet pipe has a significantly smaller outer diameter than the diameter of the bore, for example such that the surface area of the intermediate annulus is larger than the surface area of the inner diameter inlet pipe or of the mouth thereof.

A valve according to the third aspect of the invention may furthermore be provided with restoring means, for example one or more springs, for example one or more tension springs, which restore the valve piston to the open position when the supply of water to the pump inlet stops.

A valve according to the third aspect of the invention may furthermore be provided with locking means which are configured to lock the valve piston in its closed position. For example, a locking pin may be provided which can be pushed against the valve piston in the axis direction and fixed.

A valve according to the third aspect of the invention may furthermore be provided with an air valve, for example a non-return valve or a controllable valve, which air valve serves to allow, if desired, air to escape from the main cylinder, for example from said chamber, optionally automatically.

The third aspect of the invention also relates to a combined supply and discharge valve intended for use with a cultivation floor system as described herein.

The fourth aspect of the invention relates to a method for installing a cultivation floor system comprising a cultivation floor onto which plant containers are placed, which cultivation floor system comprises an ebb/flood watering installation which is configured to alternately cause a supply of water to the cultivation floor and a discharge of water from the cultivation floor, which method comprises:
providing a watertight basin with a plastic membrane as a watertight basin bottom;
placing one or more irrigation lines in the basin, preferably in such a way that an irrigation line is situated in a channel and the plastic membrane runs underneath the irrigation line, which irrigation lines provide several outflow openings along their length which make it possible for water to flow from the one or more irrigation lines;
providing a water-permeable structure in the basin, which structure has a permeable and horizontal top which forms the floor on which plant containers are placed, which structure comprises one or more layers of granular material, wherein the one or more irrigation lines are covered by the water-permeable structure.

In known practice, a protective cloth is laid over the watertight plastic membrane to protect said membrane from damage by the often-sharp granular material. In known practice, this protective cloth is also laid over the irrigation line which is provided with outflow openings.

In order to prolong the service life of the basin, it is desirable for the protective cloth to have as much protective action as possible. This can be achieved by configuring the cloth as a fabric of relatively closed structure. However, with the known practice, this would have an adverse effect on the emerging flow of water from the outflow openings of the irrigation lines, for example on the uniformity of this emerging flow.

The fourth aspect of the invention is aimed at presenting a further improvement of the ebb/flood cultivation floor systems.

The fourth aspect of the invention provides a method as mentioned above, wherein an elongate, readily water-permeable strip of gauze or an open fabric is laid over the irrigation line provided with outflow openings, which strip is configured to prevent granular material from penetrating into the outflow openings, and which strip preferably covers edge regions of the basin bottom which border the irrigation line,
and wherein a protective cloth is then laid over the watertight plastic membrane and the readily water-permeable strip, which protective cloth is configured to prevent granular material from damaging the watertight plastic membrane located underneath,
and wherein holes are made in the protective cloth at the location of the irrigation line, preferably after the protective cloth has been laid, for example exactly at the location of the outflow openings in the irrigation line,
and wherein one or more layers of granular material are then arranged in the basin.

The approach according to the abovementioned method makes it possible to optimize the protective cloth for its protective action without adversely affecting the emerging flow of water. The strip prevents granular material from penetrating into the outflow openings and thus ensures the desired emerging flow.

In a preferred embodiment of the fourth aspect of the invention, the protective cloth has a denser structure than the readily water-permeable strip, for example is configured as a closed fabric of plastic material.

In an embodiment, the protective cloth is configured as a fabric of synthetic material, and the holes in the protective cloth are produced by locally heating the cloth, preferably using hot air, for example with a hot air blower, so that the cloth melts locally and forms a hole.

In a practical advantageous embodiment, the holes in the protective cloth are made using hot air while the protective cloth is situated on top of the readily water-permeable strip, in which case the hot air makes a hole in the protective cloth, but passes through the strip without making a hole therein. The hot air is able to readily pass through the strip due to the open structure thereof and the outflow opening in the line situated underneath, so that the strip does not melt, whereas the protective cloth does.

As has been explained with respect to the first aspect of the invention, the outflow openings are preferably first dimensioned correctly in order to produce a uniform water flow. Preferably, the strip of gauze material or open fabric is subsequently laid over the line and on top thereof the protective cloth.

The fourth aspect of the invention also relates to a cultivation floor system installed by means of the method described.

The fourth aspect of the invention also relates to a cultivation floor system comprising a cultivation floor on which plant containers are placed, which cultivation floor system comprises an ebb/flood watering installation which is configured to alternately cause a supply of water to the cultivation floor and a discharge of water from the cultivation floor, which cultivation floor comprises:
a watertight basin with a plastic membrane as a watertight basin bottom;

one or more irrigation lines in the basin, preferably in such a way that an irrigation line is situated in a channel and the plastic membrane runs underneath the irrigation line, which irrigation lines provide several outflow openings along their length which make it possible for water to flow from the one or more irrigation lines;

a water-permeable structure in the basin, which structure has a permeable and horizontal top which forms the floor on which plant containers are placed, which structure comprises one or more layers of granular material, wherein the one or more irrigation lines are covered by the water-permeable structure, characterized in that an elongate, readily water-permeable strip of gauze or an open fabric is arranged over the irrigation line provided with outflow openings, which strip is configured to prevent granular material from penetrating into the outflow openings, and which strip preferably covers edge regions of the basin bottom which border the irrigation line, and in that a protective cloth is laid over the watertight plastic membrane and on or under the readily water-permeable strip, which protective cloth is configured to prevent granular material from damaging the watertight plastic membrane situated underneath, and in that the protective cloth is provided with holes at the location of the irrigation line, for example exactly at the location of outflow openings in the irrigation line, and in that one or more layers of granular material are provided in the basin, in such a manner that water flowing from or into the irrigation line runs via the readily water-permeable strip and is not impeded by the protective cloth.

The invention also relates to a greenhouse provided with a cultivation floor according to one or more of the aspects according to the invention.

It will be clear that the first, second, third and fourth aspect of the invention may be incorporated separately in a cultivation floor system, but that it is obviously also possible for several aspects to be incorporated in one cultivation floor system. Thus, for example, the first and second and optionally also the fourth aspect of the invention can be incorporated in a system, optionally furthermore provided with a valve assembly according to the third aspect of the invention.

BRIEF DESCRIPTION OF THE FIGURES

The various aspects of the invention will be explained below with reference to the drawing, in which:

FIG. 11c shows a detail of the valve of FIGS. 11a, b on an enlarged scale.

DETAILED DESCRIPTION

Figure 1:
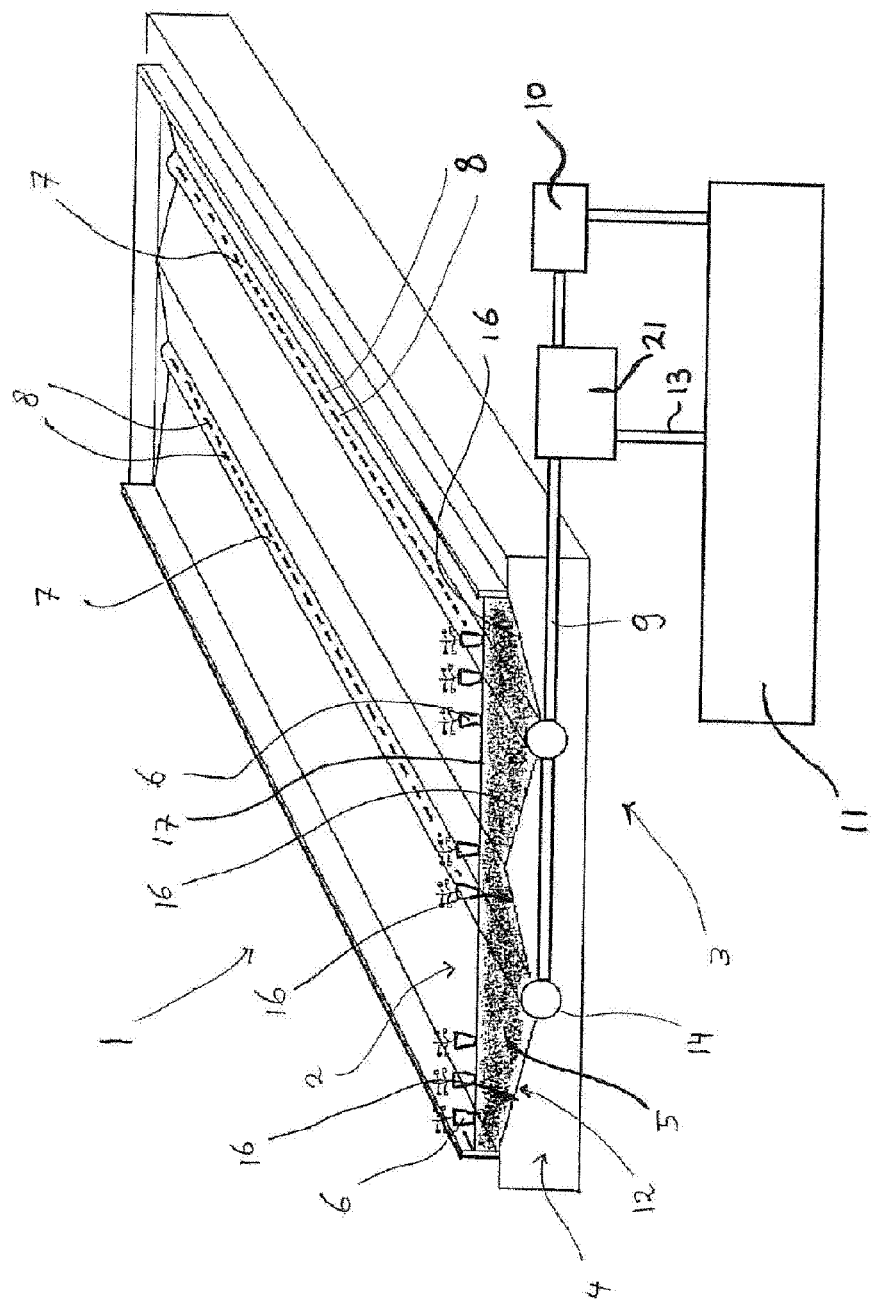
FIG. 1 diagrammatically shows a cultivation floor installation to illustrate the embodiment of the method according to the first aspect of the invention.

FIG. 1 diagrammatically shows a cultivation floor system 1 which has been installed using a method according to the first aspect of the invention. In this case, a watertight basin 4 is constructed first. The basin 4 has a bottom profile 12 which is produced in a bed, for example in a bed of sand. Several U-shaped channels 14 are provided in the bottom profile 12 and extend substantially parallel to each other. Although two channels 14 are shown in FIG. 1, the bottom profile 12 may comprise significantly more channels 14. On either side of each channel 14, the bottom profile 12 comprises a bottom surface 16 which runs off towards said channel 14. After the bottom profile 12 has been formed, the bed of the bottom profile 12 is covered with a watertight membrane 12a.

Figure 2:
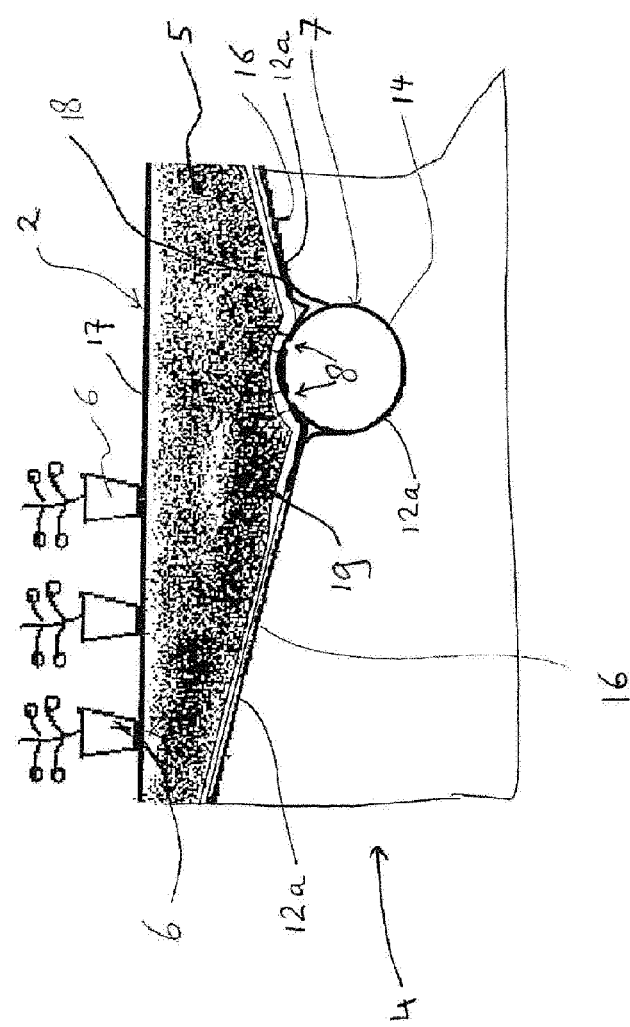
FIG. 2 shows a cross section of a part of a finished cultivation floor, partly to illustrate the fourth aspect of the invention, FIG. 3 diagrammatically shows an example of a movable tool, FIG. 4 diagrammatically shows a cut-away view of a cultivation floor installation according to the second aspect of the invention, FIG. 5 diagrammatically shows a cross section of the structure of a cultivation floor to illustrate the second aspect of the invention, FIG. 6 diagrammatically shows an example of a perforated film used in a cultivation floor installation according to the second aspect of the invention, FIG. 7 diagrammatically shows the structure of an alternative cultivation floor according to the second aspect of the invention in cross section.

Subsequently, an irrigation line 7 is laid in each channel 14. The irrigation lines 7 preferably have a closed and smooth, non-corrugated peripheral wall. The irrigation lines 7 are, for example, formed by plastic pipes with smooth walls, such as PVC pipes. The outer diameter of the irrigation lines 7 corresponds to the curvature of the bottom of the U-shaped channels 14, in other words the channels 14 are produced with a cross section which corresponds to the cross section of at least the bottom portion of the irrigation line 7 to be accommodated therein. As is illustrated in FIG. 2, this results in a top portion of an irrigation line 7 which is accommodated in a channel 14 being exposed.

When installing the irrigation lines 7, each irrigation line 7 may already have been provided with several lateral outflow openings 8, which are a distance apart in the longitudinal direction of this irrigation line 7, for example equidistant from each other. Instead, it is also possible for one or more irrigation lines 7 to be configured such that they are initially closed, that is to say have a closed pipe wall, in which case the outflow openings 8 are made after these irrigation lines 7 have been accommodated in the channels 14 and preferably in the exposed top portion of these irrigation lines 7.

The outflow openings 8 can be made in the irrigation lines 7 in different ways. The outflow openings 8 are, for example, made using a tool which is provided with a base comprising guide means, for example wheels, which are configured to engage with an irrigation line 7. The tool can be placed on an irrigation line 7 and moved along the irrigation line 7. At a location where an outflow opening 8 is desired, the tool may perform an operation on the irrigation line 7 to form the outflow opening 8, for example by drilling, milling, sawing, burning, cutting, or punching.

The irrigation lines 7 are connected to a valve assembly 21 via a supply/discharge line 20. The valve assembly 21 is furthermore connected to a water storage 11 and a water pump 10.

After the irrigation lines 7 have been accommodated in the channels 14 and provided with outflow openings 8, water is supplied to the irrigation lines 7 by means of the water pump 10. In this case, the emerging flow of water from the irrigation lines 7 is monitored, for example visually, by an individual or by a measuring system (not shown).

If undesired deviations in the emerging flow are observed, the effective emerging flow is adjusted in situ according to the invention by providing the irrigation lines 7 with one or more additional outflow openings 8 or by increasing the dimensions of one or more outflow openings 8 at a location where the emerging flow is considered to be too small and/or by closing one or more outflow openings 8 in the irrigation lines or by reducing the dimensions of one or more outflow openings 8 at a location where the emerging flow is considered to be too large.

If necessary, the steps of supplying water, monitoring and adjusting the effective emerging flow are repeated one or more times until a desired uniform emerging flow of water from the irrigation lines 7 is achieved. After the emerging flow has been made uniform, a permeable mat or cloth 18 is placed over the irrigation line 7 and adjacent surface parts 16 of the bottom profile 12.

Subsequently, a water-permeable structure 5 is arranged in the basin 4. The water-permeable structure 5 preferably comprises one or more layers of granular material, but may also (or in combination with the latter) comprise one or more water-permeable mats or cloths. In this case, the irrigation lines 7 are covered by the water-permeable structure 5.

As described, an elongate, readily water-permeable strip 18 of gauze or an open fabric may be laid over the irrigation line 7 which is provided with outflow openings, which strip 18 is configured to prevent granular material from penetrating into the outflow openings, and which strip 18 preferably covers edge regions of the basin bottom which border the irrigation line.

Thereafter, a protective cloth 19 may be placed over the watertight plastic membrane 12a and the readily water-permeable strip 18, which protective cloth 19 is configured to prevent granular material from damaging the watertight plastic membrane 12a situated underneath.

Preferably, holes are made in the protective cloth 19 at the location of the irrigation line 7, preferably after the protective cloth has been positioned, for example exactly at the location of the outflow openings 8 in the irrigation line.

Subsequently, one or more layers of granular material 5 are arranged in the basin.

The water-permeable structure 5 furthermore comprises a permeable and horizontal top layer which forms a cultivation floor 2. The top layer is, for example, formed by a top cloth 17, such as a woven top cloth, in which pores are present between the yarns of the fabric.

Preferably, the cultivation floor 2 is sufficiently stable to drive across it with a vehicle.

Plant containers 6 containing plants to be grown or the like are placed on the cultivation floor 2. The plant containers 6 are, for example, partly open on the underside and/or are configured to be completely or partly water-permeable.

The water storage 11, the water pump 10, the valve assembly 21, the supply/discharge line 9 and the irrigation lines 7 together form an ebb/flood watering installation which is configured to alternately cause a supply of water to the cultivation floor 2 and a discharge of water from the cultivation floor 2, preferably with a highest water level above the top cloth.

With the cultivation floor system 1 which comprises this method according to the invention, a particularly uniform irrigation is achieved.

Figure 3:
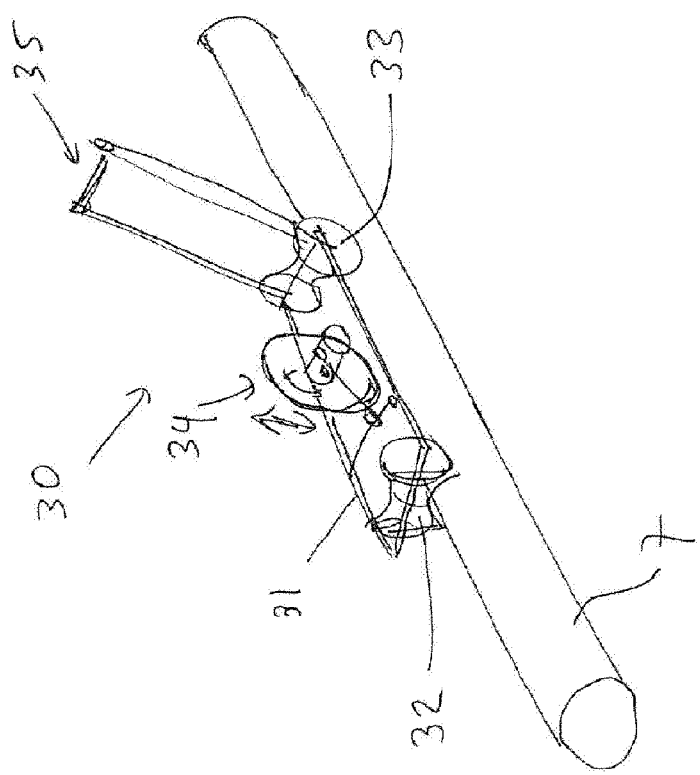

FIG. 3 diagrammatically shows an example of a movable tool 30 which is able to make outflow openings in the line. The tool 30 is provided with a frame 31 comprising a base with guide means, for example wheels 32, 33, which are configured to engage with the irrigation line 7.

In this example, a circular saw 34 is provided which can move up and down and has a saw blade and motor which can be moved downwards selectively to produce a local saw cut in the line.

Here, the tool is provided with a handle 35 by means of which an individual walking behind or next to the tool can push the tool along the line.

The first aspect of the invention is not limited to the method described by means of FIGS. 1 and 2. The person skilled in the art can make various modifications which fall within the scope of the invention.

Figure 4:
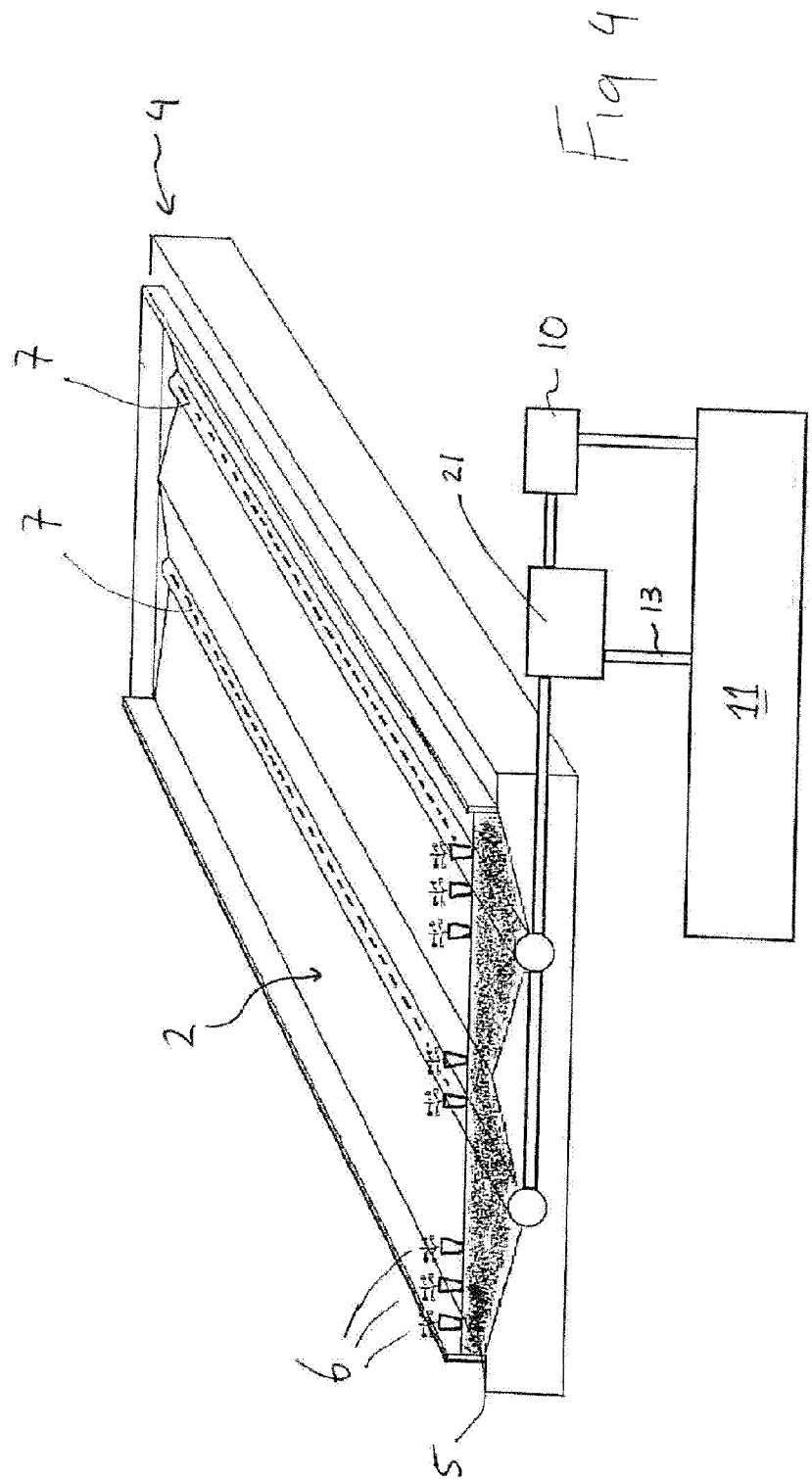

FIG. 4 shows a cultivation floor system with a floor 2 on which plant containers 6 are placed. The cultivation floor system comprises a watertight basin 4.

In the basin 4, a water-permeable structure 5 is present, which structure has a permeable top cloth 17 which forms the floor on which plant containers are placed.

The structure furthermore comprises one or more water-retaining layers, here a single layer, in this case—as is preferred—made of granular material.

Furthermore, an ebb/flood watering installation is provided which is configured for supplying water, so that water is available to the plants in the plant containers 6.

The watering installation comprises one or more irrigation lines 7 in the basin 4, which irrigation lines have several outflow openings along their length which make it possible for water to flow out of the one or more irrigation lines, wherein the one or more irrigation lines are covered by the water-permeable structure.

A water storage 11 is provided, for example a storage pond or an underground water storage, from which water can be pumped by means of a pump 10 in order to supply water to the basin 4, for example until a water level above the top cloth 17 is achieved. Once this "flood situation" has lasted sufficiently long, the water is allowed to flow away to the store 11 via the lines 7. A valve assembly 21 may be provided in order to control the desired supply of water to the basin and discharge from the basin 4. In a possible variant, the water storage 11 is above the level of the cultivation floor, so that the difference in height in fact supplies the pump action for the water supply to the cultivation floor and no separate pump is necessary in the supply to the cultivation floor. Optionally, a pump is provided in the return flow to the water storage.

The water-containing layer 5 will remain wet and thus retain water when the water has flowed from the basin 4.

The top cloth 17 is permeable, having a relatively high porosity and small pores. Preferably, the top cloth is woven, for example from suitable synthetic yarn, and the pores between the yarns of the top cloth 17 are relatively small. The top cloth is preferably UV-resistant and also wear-resistant, for example suitable to be driven over by light-weight vehicles.

Figure 5:
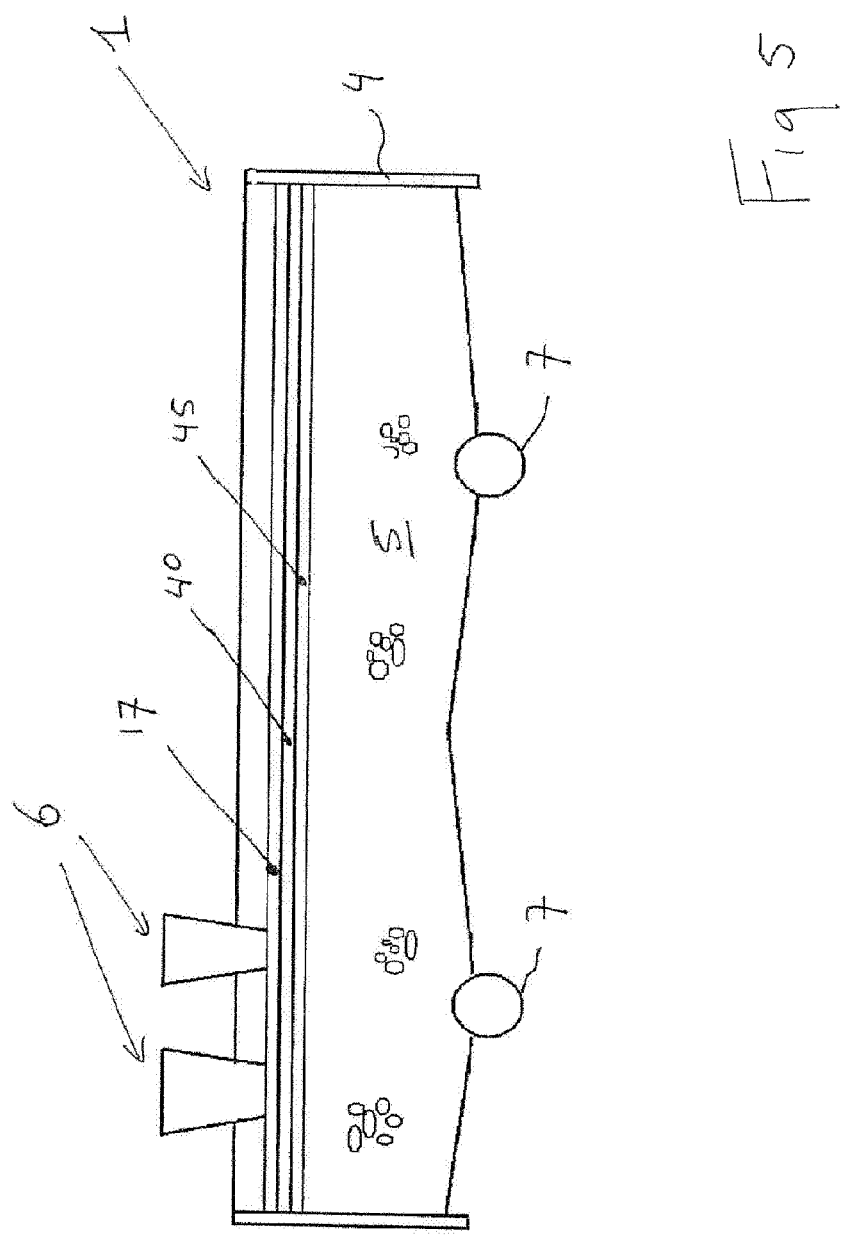

FIG. 5 diagrammatically shows a cross section, not to scale, of the structure of a cultivation floor in the system according to the second aspect of the invention.

In this case, the top cloth 17 is situated directly on top of a perforated film 40 containing perforations 41, so that a perforated film is present between the permeable top cloth 17 on the one hand and the water-retaining layer 5 on the other hand, which perforated film is made of impermeable film material which has been provided with distributed perforations in such a manner that the film reduces the free evaporation surface of water from the water-retaining layer 5 preferably by at least 50%, more preferably by at least 90%.

In this example, as an optional aspect, a capillary mat 45 is furthermore provided which has a capillary action in the horizontal direction and in the vertical direction, for example a non-woven mat of fibrous elements, for example a compacted non-woven mat. As a result thereof, transportation of moisture underneath the film is also possible in a horizontal direction, for example from plant to plant. In this case, this mat 45 is situated underneath the perforated film, directly on top of the granular layer 5. The mat 45 preferably also forms a stabilizing mat on top of the granular layer 5.

Alternatively, but less advantageously, the mat 45 is situated between the top cloth 17 and the perforated film 40.

The film 40 is closed as such, and therefore does not allow water or water vapour to pass, except at the location of the perforations 41 in said film 40.

In this way, the film 40 forms an, albeit imperfect, barrier to water, as it were, which, due to the (usually heated) climate in the greenhouse (or optionally due to heating in the cultivation floor itself) will want to evaporate from the layer 5 and rise up through the permeable structure and the permeable top cloth.

The film 40 significantly reduces the free evaporation surface, as it were. As a result thereof, water which has remained behind in the water-containing layer 5 can evaporate much less readily. Furthermore, this vapour only rises up in the film 40 at the location of the perforations 41, as a result of which it is readily possible for the top cloth 17 to dry out in the regions between these perforations.

The size of the perforations 41 is preferably chosen to be such that the perforations do not impede a possible throughflow of water in an ebb/flood watering installation.

For example, perforations 41 with diameters of between 1 mm and 12 mm or perforations with corresponding dimensions in terms of surface area are provided if a non-round shape is chosen.

For example, the distance between adjacent perforations 41 in the film 40 or between groups of smaller perforations is at least 10 mm, as a result of which dry zones can readily occur in the top cloth 17.

Figure 6:
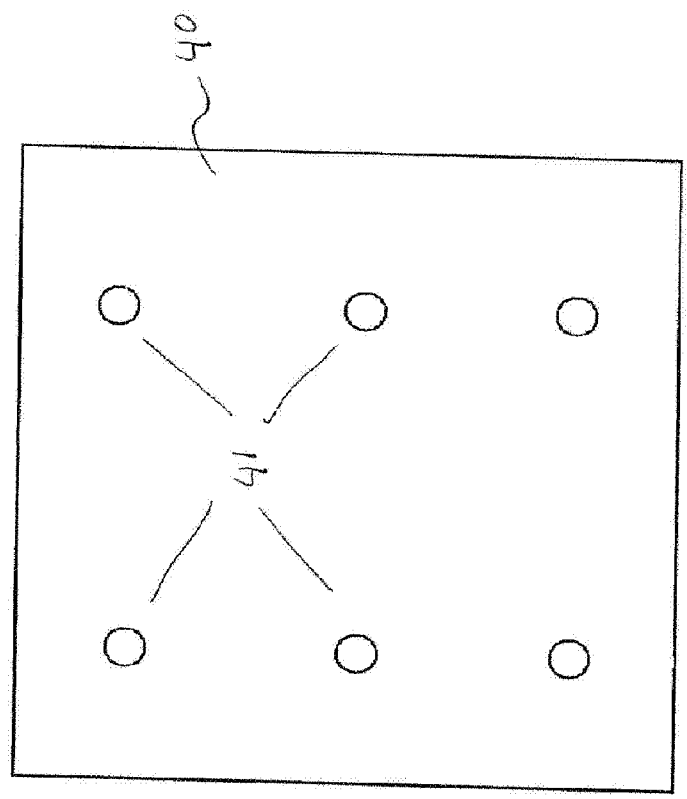

In a practical embodiment, a perforated film 40 (see FIG. 6) is provided which is made of impermeable film material which is provided with distributed perforations 41 having an average opening of between 0.75 mm$^2$ and 108 mm$^2$, wherein the perforations preferably form at most 10% of the surface area, if desired at most 5% of the surface area.

In an advantageous embodiment, the perforated film 40 is a single-layer film.

Figure 7:
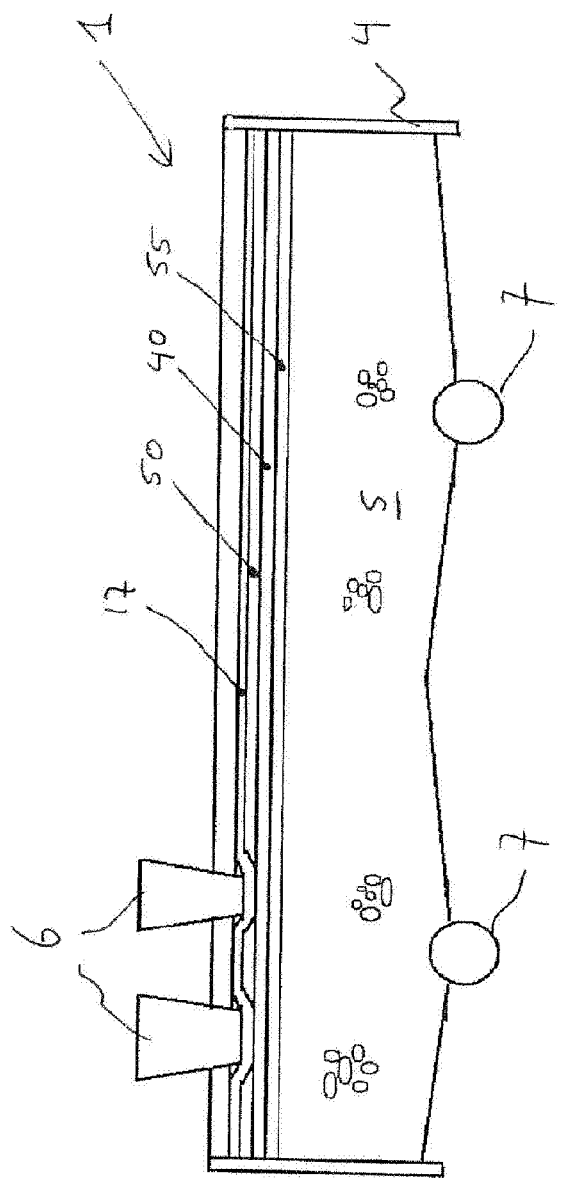

FIG. 7 shows a more complex embodiment in which the top cloth 17 is situated on a compressible mat 50 with an open structure.

This compressible mat 50 can be compressed locally by the weight of each plant container 6, which is shown diagrammatically in FIG. 7.

In the non-compressed regions of the mat 50, said mat 50 does not have any capillary action. In the compressed regions under the plant containers 6, a hydraulic connection takes place, partly or completely accompanied by capillary action, between the plant container 6 and the one or more water-retaining layers 5.

Here, the compressible mat 50 is situated on top of the perforated film 40, as is preferred, and the one or more water-retaining layers 5 are situated underneath the perforated film 40. In this way, the film reduces the free evaporation surface, so that water vapour is prevented from rising up and reaching the compressible mat 50. This is only possible at the location of the perforations 41 and not in the majority of the surface area of the film 40. As a result thereof, there is thus also a relatively dry climate in the compressible mat 50, at the location of the closed film. This contributes to the prevention of the growth of algae in or on the top cloth 17, and also contributes to a reduction of the moisture percentage in the greenhouse.

In this embodiment, the top cloth 17 in the non-compressed regions of the mat 50 is kept at an additional distance, as it were, from the one or more water-retaining layers 5, and due to the airy composition of the compressible mat, the top cloth can readily dry in those locations.

In a possible variant of a floor with compressible mat, the perforated film is situated on a capillary mat 55, as illustrated here. As is preferred, this mat is directly on top of a granular layer 5 in order thus to provide horizontal transportation of water.

The third aspect of the invention will be explained below with reference to FIGS. 8-11.

Figure 8:
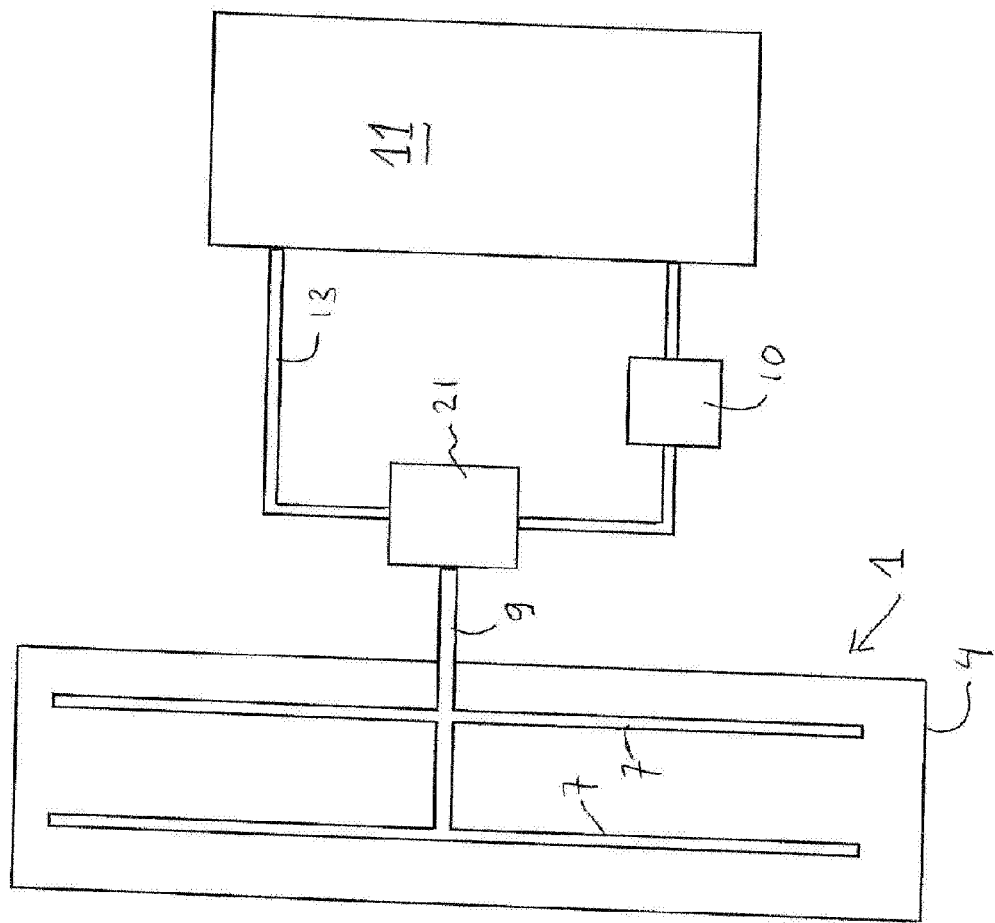
FIG. 8 shows a diagram of a cultivation floor system to illustrate the third aspect of the invention.

FIGS. 8 and 10 diagrammatically show a cultivation floor system to illustrate the third aspect of the invention.

The system 1 comprises a cultivation floor 2 with a watertight basin 4, in this case comprising a water-permeable structure 5 and a water-permeable top layer or top cloth 17 which forms the actual floor. The structure 5 comprises one or more layers of granular material, but may also (or in combination therewith) comprise one or more water-permeable mats.

Plants to be grown or the like are placed on the floor 2 in plant containers 6, for example in containers 6 which are partly open on the underside and/or are configured to be water-permeable.

Plastic pots, for example provided with holes at the underside, are used as plant containers, but other plant containers are also known. For example, the pot is made of porous and/or biological material, such as coconut fibre, or no pot is present and the plant container is, for example, a block of growth substrate, for example mineral wool or the like.

Preferably, the floor is sufficiently stable to drive a vehicle across it.

The cultivation floor system furthermore comprises an ebb/flood watering installation which is configured to alternately cause a supply of water to the cultivation floor 2 and a discharge of water from the cultivation floor, preferably at a highest water level above the top cloth 17.

The watering installation comprises:
one or more irrigation lines 7, 9 in the basin 4;
a pump 10 for supplying water to the one or more irrigation lines 7,9;
a discharge line 13;
a water storage 11, wherein the pump 10 removes water from the water storage and the discharge line returns water to the water storage.

Furthermore, a valve assembly with a combined supply and discharge valve 21 is provided, an embodiment of which will be explained in more detail with reference to FIGS. 9 and 10.

The valve 21 comprises:

a housing 61;

a main cylinder 62 in the housing 61, which main cylinder has a vertical axis;

a pump inlet 63 connected to the main cylinder 62, which pump inlet is connected to the water pump 10, an irrigation line connection 64 in the housing which is connected to the main cylinder 62 and to which the one or more irrigation lines 7, 9 are connected.

In the main cylinder 62, a valve piston 65 is provided which can be moved up and down along the vertical axis. The housing 61 is provided with a seat 66 at a bottom end of the main cylinder 62. The piston 65 may cooperate with this seat 66.

The housing is furthermore provided with an outlet connection 67 to which the discharge line 13 is connected. The outlet connection 67 is provided in a bottom part of the housing 61, underneath the seat 66, in which the main cylinder 62 is situated above this seat 66.

The piston 65 is vertically movable between a bottom closed position (see FIG. 9) in which the piston 65 engages with the seat 66 and closes off the outlet connection 67 of the main cylinder 62, and an open raised position in which the piston is lifted above the seat, so that the outlet 67 is connected to the main cylinder 62 and to the connection 64 for the irrigation lines 7,9.

The piston 65 is provided with a reservoir 68 in which water can be accumulated temporarily. The piston is provided with an outflow channel 69, so that this water can flow slowly out of the reservoir, at least if the piston 65 is in its closed position.

As shown here, the outflow 69 channel may be an open, valveless duct. But the outflow channel could also be provided with a valve, for example a valve which opens when the water level in the reservoir reaches a certain level.

The outflow 69 may be provided in the bottom of the piston, as is illustrated here, in such a manner that the outflow channel 69 directly opens out into the outlet 67.

In a variant, the outflow channel is provided in the piston, in such a way that the outflow channel is connected to the connection for the irrigation line, for example in the side wall of the piston. In this way, the reservoir 68 empties until the water level therein equals the water level on the cultivation floor. This may be dimensioned such that the weight of the water in the reservoir is then insufficient to keep the piston in its closed position, resulting in the valve 21 opening, for example under the effect of restoring means.

In this variant, a second outflow channel may be provided in such a way that it runs from a bottom point of the reservoir and ends at the seat 66, in such a way that this outflow channel is closed as long as the piston is in its closed position. If the valve then opens, the reservoir 68 will empty completely. This may be effected by means of a very small outflow channel.

The piston 65 has a reservoir inlet 68a in such a manner that when water is supplied to the pump inlet 63 of the valve 21, the reservoir in the piston fills up with water (see FIG. 9), with the additional weight of the water in the reservoir 68 being sufficient to keep the piston in its closed position.

The piston 65 and the main cylinder 62 are configured in such a manner that water can pass from the pump inlet to the irrigation line connection 64 when the piston 65 is in the closed position.

A restoring mechanism 70 is provided, in this case with one or more springs, and forces the piston 65 into its open position when the water volume in the reservoir 68 of the piston has dropped below a certain amount, for example if the reservoir has emptied virtually completely. In a variant of the restoring mechanism, for example, a counterweight (via a cable or lever or the like) or a float is provided.

Figure 9:
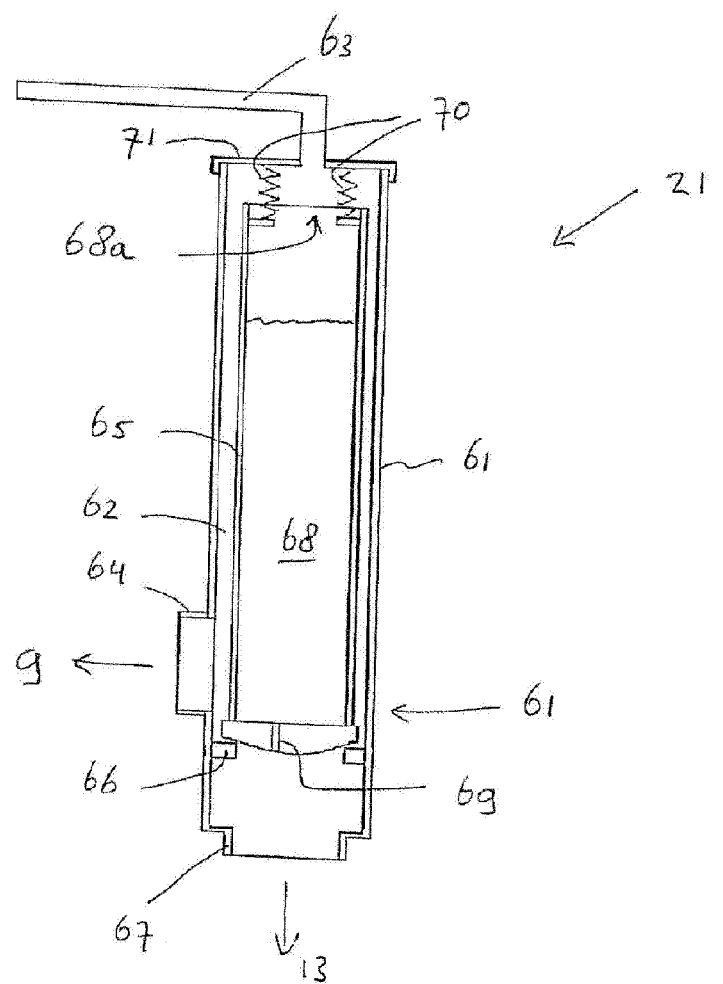
FIG. 9 shows a vertical cross section of an exemplary embodiment of the combined water supply and discharge valve according to the third aspect of the invention, FIG. 10 diagrammatically shows a cultivation floor with a watering installation provided with the valve of FIG. 9, FIGS. 11a and 11b show a cross section of a variant of the combined water supply and discharge valve for a cultivation floor.

FIG. 9 shows how the outflow of the piston 65 is provided in the bottom of the reservoir and ends at the outlet connection 67 of the valve 21 when the piston is in its closed position. The reservoir can then always be emptied in a reliable manner.

If desired, an adjustable outflow of the piston reservoir 68 may be provided, so that the speed at which the reservoir empties in the piston can be adjusted and thus the time for which the valve 21 remains closed and the high water level is maintained in the basin.

FIG. 9 shows how a removable cover 71 is provided at the top side of the housing 61, so that the piston 65 can be removed from the main cylinder, for example for cleaning.

FIG. 9 shows that the reservoir inlet 68a is situated at the top side of the piston and the pump inlet 63 ends above the reservoir inlet 68a. As a result thereof, this reservoir is filled immediately and the valve closes in a reliable manner as soon as water is sent in the direction of the basin. In a variant, an inlet pipe is positioned in the reservoir via the reservoir inlet 68a, for example so far that the thrust from the supplied water, which thrust acts on the piston 65, also serves to close the valve.

The piston 65 has a smaller outer diameter than the inner diameter of the main cylinder 62, so that a ring-shaped passage for water is present, through which water can flow from the pump inlet to the irrigation line connection when the valve is closed. This solution is very simple and prevents the piston from becoming clamped in the cylinder.

In a possible embodiment, a restriction element is provided, as will be explained below with reference to FIG. 11, as a result of which, for example, the closing force on the valve piston is increased by an increasing water pressure upstream of the restriction element.

In a simple embodiment, the housing comprises a plastic pipe section, preferably made of PVC, which forms the main cylinder 62.

In a simple embodiment, the piston 65 comprises a plastic pipe section, preferably made of PVC, which forms the reservoir 68 of the piston.

In a simple embodiment, the bottom portion of the valve 21 is configured as a T-piece made of plastic, for example a T-piece for PVC pipes, in which case the one socket accommodates the length of pipe forming the main cylinder, the other socket forms the irrigation line connection, and a third insertion socket forms the outlet connection. Optionally, a sealing ring of the T-piece may serve as a seat 66 for the valve.

In a system, for example a greenhouse, comprising several basins 4 which can be operated separately, a combined supply and discharge valve 21 is preferably provided at each basin.

In order to supply water to the cultivation floor 2, water is supplied to the pump inlet 63 of the combined supply and discharge valve 21 by means of the pump 10, as a result of which the reservoir 68 in the piston 65 is filled and the piston 65 is pushed onto the seat 66 in its closed position. As a result thereof, the supplied water flows to the irrigation line connection 64 and to the one or more irrigation lines 7, 9 via the passage in the housing 61 before flowing into the basin 4. This supply is stopped when the water in the basin has reached a desired water level. Instead of or in addition to the passage between valve piston and the cylindrical part of the housing, a bypass duct may also be provided in the housing.

The floor may be overflowed by the supplied water, so that the bottom portions of the plant containers are submerged in water. However, it is also conceivable for the water level not to be higher than the floor, for example when the water supply is used to make/keep the permeable structure itself wet and/or to cool the floor with the water.

In that case, the water runs from the reservoir 68 via the outflow channel 69, but the valve 21 remains closed as long as the amount of water in the reservoir 68 of the piston 65 is sufficient to keep the valve in its closed position.

The piston 65 of the valve 21 moves into its open position if the amount of water in the reservoir 68 of the piston has dropped below a certain amount, so that the water via the one or more irrigation lines 7, 9, the irrigation line connection 64, and the outlet connection 67 flows from the basin to the water storage.

Another combined supply and discharge valve 80 for a cultivation floor system with an ebb/flood watering installation will now be described with reference to FIGS. 11a, 11b and 11c.

The valve 80 comprises a housing 81 having a main cylinder 82 in the housing, which main cylinder has an axis 82a, optionally or even preferably a horizontal axis.

The valve 80 furthermore comprises a pump inlet 83, configured here as an end of an inlet pipe 84. The pump inlet 83 is connected to the main cylinder via the inlet pipe 84. In addition, the pump inlet 83 is connected to the pump 10.

The housing is furthermore provided with an irrigation line connection 85 which is connected to the main cylinder 82 and to which the one or more irrigation lines 7,9 are connected.

A valve piston 86 is provided in the main cylinder 82 and is movable along the axis 82a.

The housing is provided with a seat 87 at one end of the main cylinder 82. In addition, the housing is provided with an outlet connection 88 to which the discharge line 13 is connected.

The outlet connection 88 is provided in an end part of the housing, on that side of the seat 87 which is turned away from the main cylinder.

The valve piston 86 can be moved to and fro in the main cylinder between a closed position (FIG. 11a) in which the piston 86 sealingly bears against the seat 87, thus closing off the outlet connection 88 of the main cylinder 82.

FIG. 11b shows the open position in which the piston 86 is at a distance from the seat 87, so that the outlet connection 88 is connected to the main cylinder 82.

A flow path for water is present between the valve piston 85 and the housing 81, in such a way that water can pass from the pump inlet 83 to the irrigation line connection 88 when the piston is in the closed position (see FIG. 11a).

At the end which is turned away from the seat 86, the housing 81 has an end cap 89, for example as a removable cover, which forms a closure for the main cylinder 82, so that a chamber 90 is formed between this end cap 89 and the valve piston 86 which chamber 90 can be varied in size by the position of the piston 86 and which is connected to the pump inlet 83.

The valve 80 is furthermore provided with a restriction element 91 which forms a restriction at a location between the valve piston 86 and the housing 81 for the water which is supplied via the pump connection 83, so that a water pressure is created and/or increased upstream of the restriction 91, which water pressure brings and keeps the valve piston 86 in its closed position.

In the illustrated practical embodiment, the restriction element 91 is a stationary and rigid restriction element 91, which defines a fixed restriction surface area for the water flow, which surface area is preferably smaller than the inner diameter of the pump inlet 83.

In the illustrated embodiment, it is provided that the restriction element 91 is arranged between the outer periphery of the valve piston 86 and the surrounding portion of the housing 81. Here, the restriction element is fitted on the outer periphery of the valve piston 86 in the form of a ring 91, with an annular gap being present between the ring and the housing as a restricting passage for the water flow.

In FIGS. 11a, b, it can furthermore be seen that the valve piston 86 has a tubular portion 86a which extends along the axis 82a and has a bore 93 which is open at that end of the valve piston 86 which is turned away from the seat 87. The housing furthermore comprises the inlet pipe 84 which is connected to the pump inlet and which in this case extends along the axis 82a and into the bore 93 in the tubular portion 86a of the valve piston 86. Preferably, the inlet pipe only has a mouth 84a at its axial end, so that the water squirts against the blind end of the bore in the valve piston 86 in the axial direction. Preferably, the inlet pipe 84 has a significantly smaller outer diameter than the diameter of the bore 93, for example such that the surface area of the intermediate annulus is greater than the surface area of the inner diameter inlet pipe 84 or of the mouth 84a thereof.

In addition, restoring means are provided, for example one or more springs, for example one or more tension springs 95, which reset the valve piston 86 to the open position when the supply of water to the pump inlet 83 stops.

In one possible embodiment, locking means are provided which are configured to lock the valve piston in its closed position. For example in a locking pin is provided which can be pressed against the valve piston in the axis direction and secured.

The valve 80 may be provided with an air valve 96, for example a non-return valve or an actuable valve, which air valve serves to allow air to escape—if desired—optionally automatically, from the main cylinder, for example from said chamber.

The valve 80 may be constructed in the same way from PVC pipe material as described with reference to the other valve.

If the valve 80 is intended to be positioned vertically or obliquely, this valve 80 may also be provided with an outflow as described with reference to the other valve.

What is claimed is:

1. A cultivation floor system with a floor on which plant containers are to be placed, wherein said cultivation floor system comprises:
   a watertight basin;
   a water-permeable structure arranged in the basin so as to fill a bottom section of the basin and extend upward from the bottom section of the basin, wherein said water-permeable structure comprises one or more water-retaining layers;
   a permeable woven top cloth positioned above said water-permeable structure, wherein said permeable woven top cloth forms the top side of the floor on which plant containers are placed; and
   a watering installation which is configured to supply water so that water is available for plants in the plant containers,
   wherein the permeable woven top cloth has a high porosity and small pores,
   wherein a perforated film is placed between the permeable woven top cloth on the one hand and the one or more water-retaining layers on the other hand, wherein said perforated film is made of impermeable film material which is provided with distributed perforations in such a manner that the film reduces the free evaporation surface for water from the one or more water-retaining layers by at least 50% and allows water and water vapor to pass through the perforated film only at the location of the perforations, so that the top cloth can dry out in the regions between the perforations.

2. A cultivation floor system according to claim 1, wherein the perforated film is made of impermeable film material which is provided with distributed perforations having an average opening of between 0.75 mm$^2$ and 108 mm$^2$.

3. A cultivation floor system according to claim 1, wherein the perforated film is a single-layer film.

4. A cultivation floor system according to claim 1, wherein the top cloth is situated directly on top of the perforated film.

5. A cultivation floor system according to claim 1, wherein the top cloth is situated on a compressible mat having an open structure, wherein said compressible mat is configured to be compressible locally by each plant container, wherein the compressible mat is configured such that, in use, non-compressed regions of the mat exhibit no or scarcely any capillary action and compressed regions provide a hydraulic connection between a plant container and the one or more water-retaining layers, wherein the compressible mat is situated on top of or underneath the perforated film and wherein the one or more water-retaining layers are situated at a lower level.

6. A cultivation floor system according to claim 1, wherein the perforated film is situated on top of or underneath a capillary mat which has a capillary action in horizontal direction and in vertical direction.

7. A cultivation floor system according to claim 1, further comprising an ebb/flood watering installation which is configured to alternately cause a supply of water to the cultivation floor and a discharge of water from the cultivation floor, wherein said watering installation comprises:
   one or more irrigation lines in the basin, wherein said irrigation lines have outflow openings along their length which make it possible for water to flow from the one or more irrigation lines, wherein the one or more irrigation lines are covered by the water-permeable structure in the basin.

8. A cultivation floor system according to claim 1, wherein the perforated film is made of impermeable film material which is provided with distributed perforations having an average opening of between 0.75 mm$^2$ and 108 mm$^2$, wherein the perforations form at most 10% of the surface area of the perforated film.

9. A cultivation floor system according to claim 1, wherein the perforated film is a single-layer film made of plastic.

10. A cultivation floor system according to claim 1, wherein the perforated film is made of impermeable film material which is provided with distributed perforations having a diameter between 0.5 millimeter and 12 millimeters.

11. A cultivation floor system according to claim 1, wherein the perforated film is made of impermeable film material which is provided with distributed perforations having a diameter between 7 millimeters and 11 millimeters.

12. A cultivation floor system according to claim 1, wherein the perforated film is made of impermeable film material which is provided with distributed perforations, wherein adjacent perforations are spaced apart at least 10 millimeters.

13. A greenhouse provided with a cultivation floor system with a floor on which plant containers are to be placed, wherein said cultivation floor system comprises:
   a watertight basin;
   a water-permeable structure arranged in the basin so as to fill a bottom section of the basin and extend upward from the bottom section of the basin, wherein said water-permeable structure comprises one or more water-retaining layers;
   a permeable woven top cloth positioned above said water-permeable structure, wherein said permeable woven top cloth forms the top side of the floor on which plant containers are placed; and
   a watering installation which is configured to supply water so that water is available for plants in the plant containers,
wherein a perforated film is placed between the permeable woven top cloth on the one hand and the one or more water-retaining layers on the other hand, wherein said perforated film is made of impermeable film material which is provided with distributed perforations in such a manner that the film reduces the free evaporation surface for water from the one or more water-retaining layers by at least 50% and allows water and water vapor to pass through the perforated film only at the location of the perforations, so that the top cloth can dry out in the regions between the perforations.

* * * * *